Feb. 6, 1923.
J. WIMP
BED FOR AUTOMOBILES
Filed Sept. 19, 1921     2 sheets-sheet 1
1,444,532
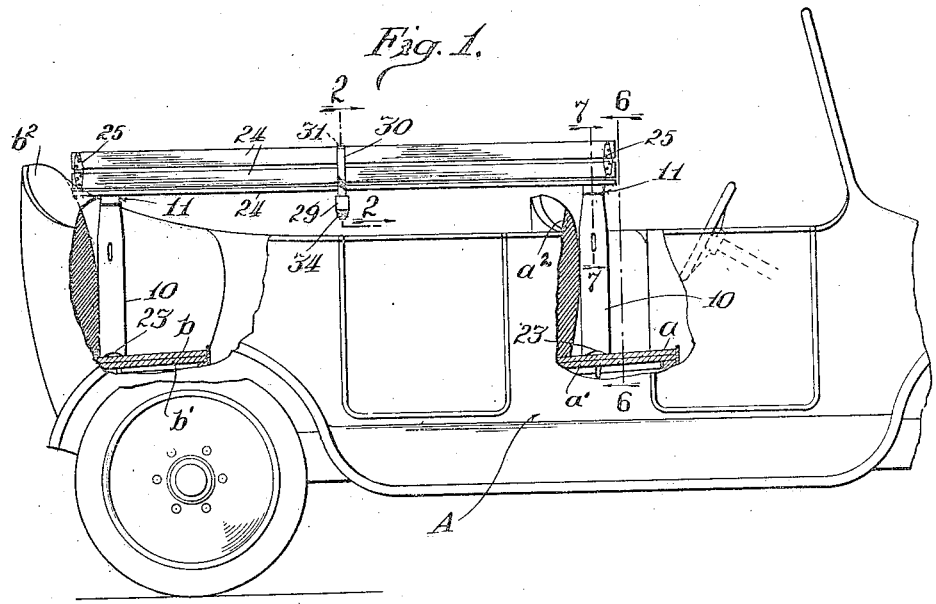
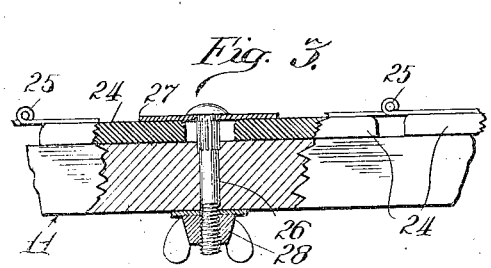
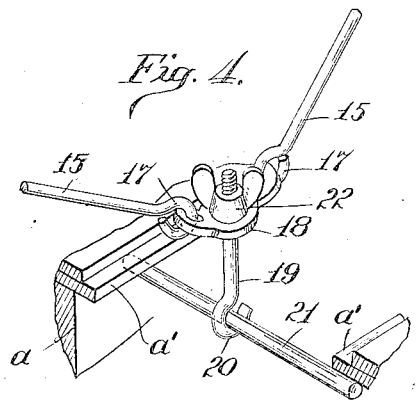
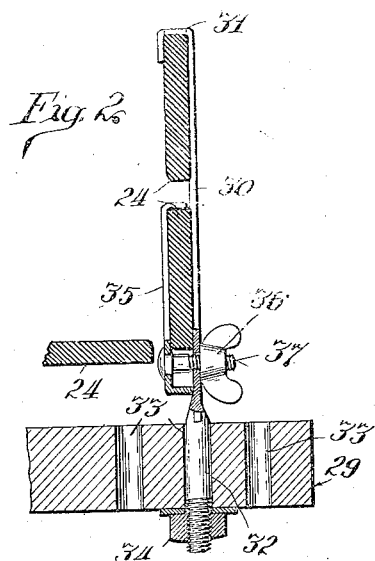
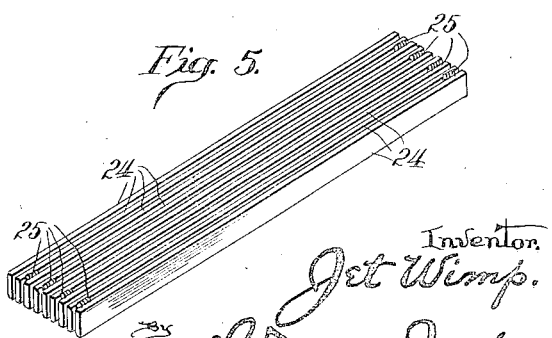
Inventor
Jet Wimp.
By Adams & Jackson
Attorneys

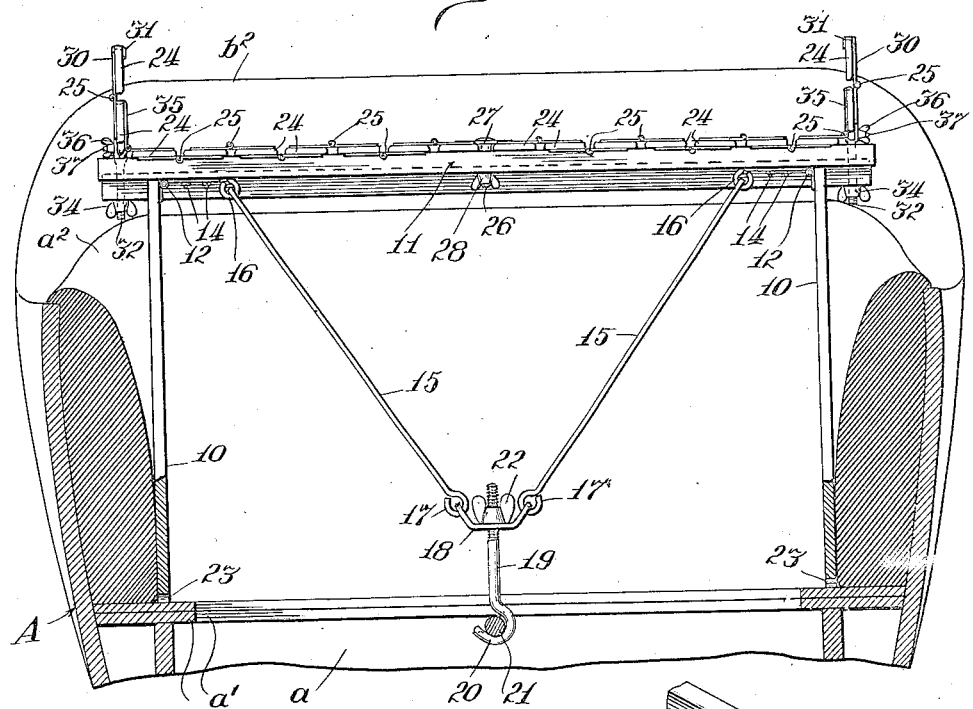
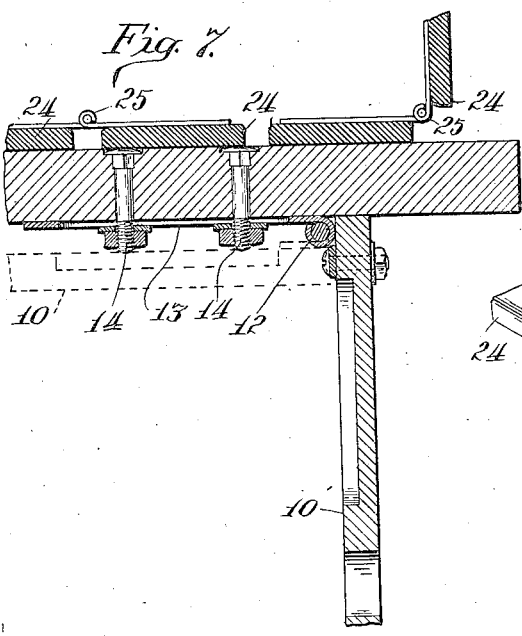
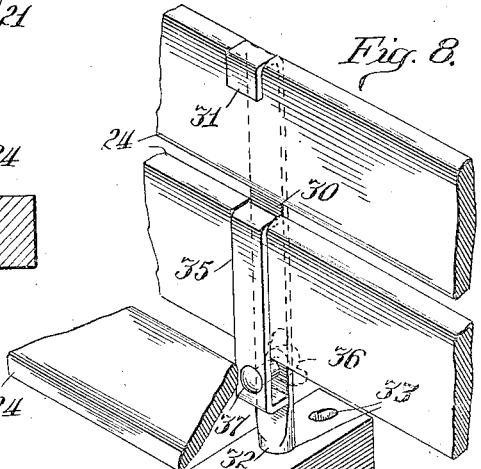

Patented Feb. 6, 1923.

1,444,532

UNITED STATES PATENT OFFICE.

JET WIMP, OF CHICAGO, ILLINOIS.

BED FOR AUTOMOBILES.

Application filed September 19, 1921. Serial No. 501,682.

*To all whom it may concern:*

Be it known that I, JET WIMP, a citizen of the United States, and a resident of Chicago, in the county of Cook and State of Illinois, have invented certain new and useful Improvements in Beds for Automobiles, of which the following is a specification, reference being had to the accompanying drawings.

This invention relates to improvements in beds adapted to be carried by and set up for use in automobiles. It is the leading object of the invention to provide a construction which in its knock-down state may be so compact and of such shape as to adapt it to be carried upon one of the running boards of any ordinary make of automobile that is built to carry from five to seven passengers, and which bed structure can be readily set up for use within the body of such automobile without having to disturb or disarrange any of the parts of such machine other than to remove the cushions from the front and rear seats so that the supporting frame members of the bed that constitute the head and foot pieces thereof may rest solidly upon the tops of the box-like seat members that the said cushions ordinarily are placed upon, the said head and foot pieces being high enough so that the mattress-supporting member of the bed will, as it rests thereon, also extend across the top of the back of the front seat of the machine. Further objects of the invention are to provide strong and novel means for holding said head and foot supporting members clamped rigidly to the said front and rear box-like seats, respectively; to provide a novel mattress-support adapted to rest at its end portions upon said head and foot members; to provide means extending transversely of said mattress-support and adjustably connected therewith at any point intermediate its ends so as to prevent undue sagging thereof under the weight of the occupant or occupants of the bed; to provide means for holding in an upturned position the side edge portions of such mattress-support so that the mattress that is laid thereon will not be permitted to shift laterally and which upturned portions will also serve as rigid supports for the said means that are employed to prevent undue sagging; and to improve in various details of construction of devices of this general character. I accomplish these objects by the construction and combinations of parts shown in the drawings, and hereinafter particularly described. That which I believe to be new will be set forth in the claims.

In the drawings,—

Fig. 1 is a side elevation of an automobile body with my improved bed set up therein, portions of said body being broken away;

Fig. 2 is an enlarged detail, being a vertical section taken on the line 2—2 of Fig. 1, and showing the means that are employed for holding one of the side portions of the mattress-supporting member in an upturned position and that also supports in place the cross-bar that extends laterally beneath such member;

Fig. 3 is a detail, partly in elevation and partly in section, illustrating the means employed for clamping to one of the supporting members the mattress-supporting member;

Fig. 4 is a perspective view of the means employed in connection with each said supporting member for clamping it securely to one of the seats of an automobile;

Fig. 5 is a perspective view of one of the two slatted sections that together constitute the mattress-support,—such section being shown in folded-up condition;

Fig. 6 is a vertical section taken on the line 6—6 of Fig. 1;

Fig. 7 is an enlarged detail, being a vertical section taken on the line 7—7 of Fig. 1; and Fig. 8 is a perspective view of the parts shown in Fig. 2.

Referring to the several figures of the drawings,—A indicates a body of any ordinary automobile of a make having the usual front and rear seats. Such seats are here indicated, respectively, by $a$ and $b$, and as usual, each seat is of box-like formation open entirely at the upper side except as it is provided with the usual marginal ledges, here indicated on the front seat by $a'$ and and on the rear seat by $b'$, which ledges are designed to receive and support the frames of the ordinary removable cushions (not shown). I refer to these ledges $a'$ and $b'$ inasmuch as I make use of them, in a manner hereinafter explained, in connection with the securing of my improved bed in position. The usual seat-backs are indicated by $a^2$ and $b^2$, respectively.

The improved bed comprises two similar supporting frames, each of which, in the construction shown, is formed of two legs 10 and a cross bar 11. Each leg 10 is secured to the under face of its cross bar by a hinge 12, and, as best shown in Fig. 7, I prefer to form that leaf of the hinge that lies against the under face of the cross bar 11 with a a long slot 13 through which pass bolts 14. By this construction it will be evident that by loosening the nuts on such bolts the two legs 10 of each bar 11 can be adjusted closer to or farther from each other, and when adjusted to the desired distance apart, the said nuts upon being tightened will hold such legs in the positions set. This adjustment of the legs is desirable to suit different widths of automobile bodies. As shown in Fig. 6, each pair of legs 10 is adapted to rest on the end ledges $a'$ of one of the box-like seats $a$. 15—15 indicate two links that are connected near opposite ends of a cross bar 11, such cross bar, in the construction shown, being provided with eyes 16 in its under surface to which hooked upper ends of the links 15 engage. The lower end of each of the links 15 is formed with an eye 17, such eyes being in engagement with opposite sides of a head 18, through an opening in the center of which freely passes a rod 19 that is screw-threaded upon its upper end, and at its lower end is formed with a hook 20. This hook 20 is adapted to engage over a rod or bar 21, the ends of which are placed under those parts of the ledge $a'$ of the adjacent seat that run lengthwise of such seat, as clearly shown in in Fig. 4. A wing nut 22 is shown as screwed upon the rod 19 and against the upper face of the head 18. It will be evident that upon such nut being screwed down tightly, it will cause a downward pull to be exerted upon the links 15, and thereby hold the legs 10 in firm contact with the opposite portions of the seat ledge. I prefer to slightly under cut the edge of each leg as at 23, as thereby the leg is more apt to be firmly seated against the ledge than if such edge of the leg were perfectly straight. It will be understood that each supporting member comprising the legs 10 and cross bar 11 will be constructed and set up into position in the manner described. These two supporting members rise to a height a little above the back $a^2$ of the front seat so as to permit a mattress-supporting member to rest upon the two supports, and at the same time extend over such front seat-back, as clearly shown in Fig. 1.

The mattress-supporting member referred to is, in the construction shown, formed of a plurality of slats 24 placed parallel to each other and a little distance apart, the various slats being connected one with the other by hinges 25, these hinges being alternately on the upper and lower faces of the slats, as clearly shown in Fig. 6, whereby when not in use the several slats can be folded one upon another in the manner shown in Fig. 5, so that a compact bundle of connected slats is formed suitable for storage or for transportation on one of the running boards of the automobile. While, of course, all of the slats that go to make up the support for a mattress or bed might be hinged together in the manner described, yet I prefer to form them in two sections, each comprising one-half of the total number of slats. Such a section is shown in Fig. 5. Making the device in two such parts is of advantage from several standpoints, viz, it is easier handled when in two sections; it can be better adapted to different widths of automobiles so as to occupy all the space from side to side thereof because the two sections can be separated from each other as desired without impairing its efficiency even though a little greater space be left between such sections than is present between the several slats of each section; and also such division of the two sections enables a single clamping device at each end of the bed to be used that will hold the inner edges of both sections firmly clamped to the end cross bar 11. In Fig. 3 I have shown this clamping device, which comprises a bolt 26 that passes through an opening in one of the cross bars 11, the upper end of such bolt lying in a space between the inner slats of the two sections referred to. This space between the two sections is bridged by a plate 27 through which the bolt also passes, and against the upper face of which its head bears. On the lower screw-threaded end of such bolt is a wing nut 28, and it will be evident that by screwing up such nut the plate 27 will be held tightly against the faces of the inner slats of the two sections, and thus hold the two slatted mattress-supporting sections firmly clamped to said cross-bar.

It is desirable to have the outer side portions of the mattress holding member upturned so as to form side walls, and in the construction shown I do this by turning up two of the hinged slats at the outer side of each mattress supporting section, and providing means that rigidly hold such two slats in that position. Such means comprises a cross-bar 29 which extends transversely of the mattress-supporting member substantially midway between the ends thereof, and at some little distance below it, as best shown in Fig. 2. At each end of this cross-bar is a metal rod 30 which for the greater part of its length is preferably flattened so as to lie snugly alongside of the outer faces of the upturned slats, and at its upper end is provided with a hook 31 of a size and shape to engage over the upper edge of the upper one of said two slats. The lower portion of the rod 30, in the construction shown, is cylindrical, as indicated at 32, such end lying within one of a number of holes 33 through the cross-bar 29. The lower end of the cylindrical portion 32 is screw-threaded, as shown, to adapt a nut 34 to be screwed thereon. To strengthen the upright rod 30 and to distribute the weight of the cross-bar 29 and any load that may be imposed thereon, as hereinafter explained, I provide a clamping member 35 in the form of a short metal strap that lies against the inner face of the lowermost upturned slat and has its ends inwardly turned toward the bar 30, the upper inwardly turned end lying upon the upper edge of said lowermost slat. The clamping member is adapted to be solidly clamped against such lowermost slat and to the rod 30 by means of a nut 36 and a bolt 37 that passes through the two members 35 and 30, as clearly shown in Fig. 2. I have called attention to the fact that the cross-bar 29 is at some little distance below the mattress-supporting member. I so arrange it so that the slats of such member, except the upturned ones, may yield under the weight of the occupants of the bed, but to prevent undue yielding the cross-bar 29 will be so located as to have the slats come in contact with it when a very heavy person or persons occupy the bed, and by such contact the breaking of the slats will be prevented. By having the marginal slats upturned as shown a very rigid construction is provided from which to support the transverse cross-bar 29. As will be understood, the cross-bar can be vertically adjusted as may be required by manipulation of the nuts 34. I have also called attention to the fact that the mattress holding member is formed in two sections which can be adjusted closer to or farther from each other as may be desired, and it is because of that possibility of adjustment that I provide more than one hole 33 at each end of the cross-bar 29, as will be understood.

When the bed is not in use it can be readily disassembled, and the parts folded up in compact form for carrying in any suitable receptacles that can be secured to a running board of the machine. To take down the bed the mattress will first be disengaged from the supporting frames at the ends and from the transverse cross-bar 29 by unscrewing the several nuts that have been referred to as holding these parts connected, and the two slatted sections then each folded up into the position indicated by one of them in Fig. 5. Thereafter the nuts 22 will be loosened sufficiently to permit the disengagement of the short cross-bars or rods that engage the ledges of the front and back seats, and the diagonal rods will be unhooked from the eyes 16. The two legs 10 of each end member will then be turned against their respective cross-bars 11, the inner faces of such legs being preferably cut away or provided with holes, as shown, at the points where they will come opposite the eyes, hinge members, etc., that are carried by the said cross-bars 11.

By my improvements I provide a construction that can be readily and easily set up in place in any ordinary five passenger or seven passenger automobile without disturbing any of the fittings or parts of such machine other than the seat cushions, and when so set up will be very firmly and securely held in place, and will provide a comfortable bed of sufficient width and strength to easily accommodate at least two adult persons.

What I claim as my invention and desire to secure by Letters Patent, is,—

1. A bed structure for use with an automobile having front and rear seats, said structure comprising in combination two supporting frames adapted to be supported from opposite end portions of said seats respectively, means extending from the upper part of each of said frames toward the adjacent seat, other means for detachably connecting said last-named means with said seat, and a mattress-supporting member carried by said frames.

2. A bed structure for use with an automobile having front and rear seats, said structure comprising in combination two supporting frames adapted to be supported from opposite end portions of said seats respectively, each of said frames being formed of two legs and a cross-bar connecting the upper ends of the legs, tension means adapted to be connected with each seat and the cross-bar of the frame supported thereby for exerting a downward pull on the frame to hold it firmly in place, and a mattress-supporting member carried by said frames.

3. A bed structure for use with an automobile having front and rear seats, said structure comprising in combination two supporting frames adapted to be supported from opposite end portions of said seats respectively, each of said frames being formed of two legs and a cross-bar connecting the upper ends of the legs, tension means connecting opposite end portions of each frame cross-bar with an intermediate portion of that seat that supports the frame whereby the said legs may be forced tightly against and held to such seat, and a mattress-support carried by said frames.

4. A bed structure for use with an automobile having front and rear seats, said structure comprising in combination two supporting frames adapted to be supported from opposite end portions of said seats respectively, each of said frames being formed of two legs and a cross-bar connecting the upper ends of the legs, two links connected with opposite end portions of each frame cross-bar, and means adapted to be connected with the seat that the frame rests upon for exerting a downward pull on said links to force the legs of the frame tightly against and held to such seat, and a mattress-support carried by said frames.

5. A bed structure for use with an automobile having front and rear seats, said structure comprising in combination two supporting frames adapted to be supported from opposite end portions of said seats respectively, each of said frames being formed of two legs and a cross-bar connecting the upper ends of the legs, two downwardly converging links connected with opposite end portions of each frame cross-bar, a head to which the lower ends of such links are connected, means for forcing said head toward the adjacent seat to cause the legs to be pressed forcibly against and held to the seat, and a mattress-support carried by said frames.

6. A bed structure for use with an automobile having front and rear seats each provided with inwardly-directed marginal ledges, said bed structure comprising in combination two supporting frames adapted to be supported from opposite end portions of said seats respectively, each of said frames being formed of two legs and a cross-bar connecting the upper ends of the legs, a rod adapted to extend across each seat beneath the said ledges thereof, tension means interposed between each of said rods and the cross-bar of the adjacent supporting frame, and a mattress-support carried by said frames.

7. A bed structure for use with an automobile having front and rear seats each provided with inwardly-directed marginal ledges, said bed structure comprising in combination two supporting frames adapted to be supported from opposite end portions of said seats respectively, each of said frames being formed of two legs and a cross-bar connecting the upper ends of the legs, a rod adapted to extend across each seat beneath the said ledges thereof, tension means interposed between each of said rods and the cross-bar of the adjacent supporting frame, and a mattress-support carried by said frames, each of said tension means comprising a screw-threaded rod detachably connected with said first-mentioned rod and two links connected with said screw-threaded rod and with such cross-bar.

JET WIMP.